A. O. SLENTZ.
BEARING CONNECTION FOR SHEARS.
APPLICATION FILED MAR. 4, 1908.
998,210. Patented July 18, 1911.
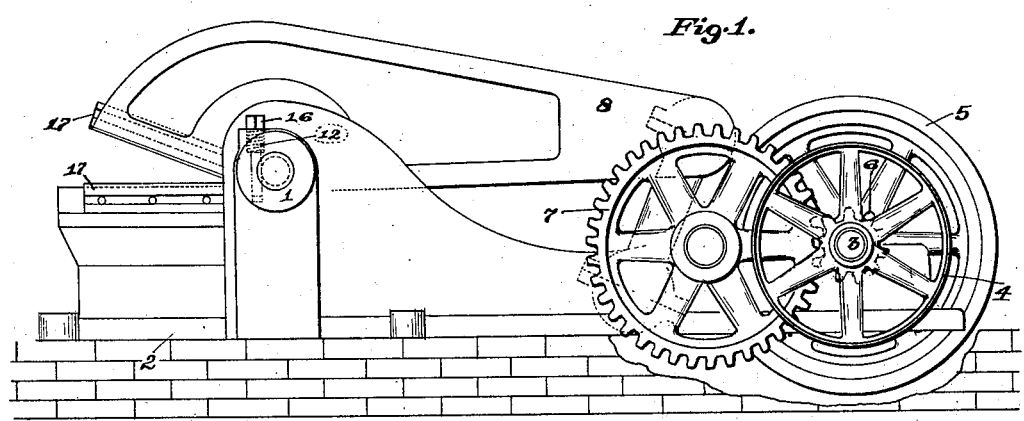
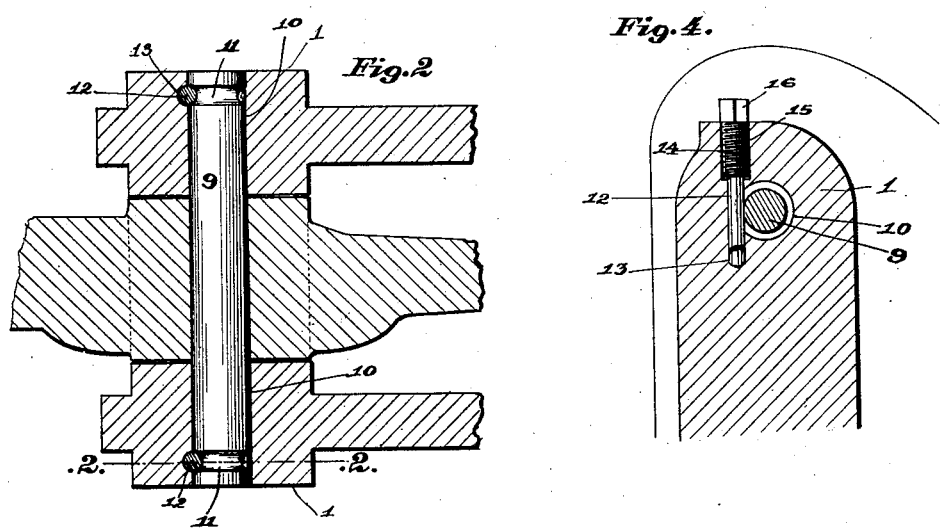
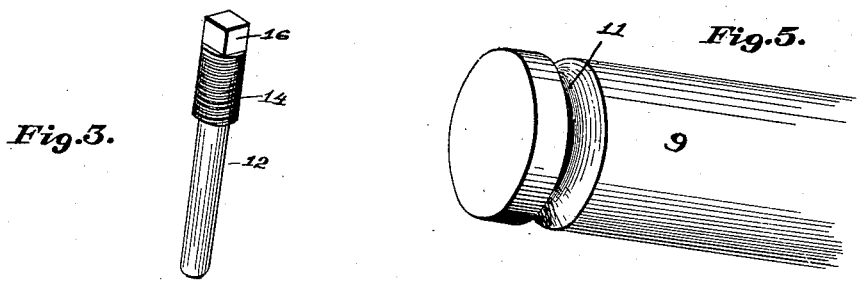
Witnesses
Inventor
Albertus O. Slentz
By Bond & Miller
Attorneys.

UNITED STATES PATENT OFFICE.

ALBERTUS O. SLENTZ, OF CANTON, OHIO, ASSIGNOR TO THE CANTON FOUNDRY AND MACHINE COMPANY, OF CANTON, OHIO, A CORPORATION OF OHIO.

BEARING CONNECTION FOR SHEARS.

998,210.     Specification of Letters Patent.     Patented July 18, 1911.

Application filed March 4, 1908. Serial No. 419,183.

*To all whom it may concern:*

Be it known that I, ALBERTUS O. SLENTZ, a citizen of the United States, residing at Canton, in the county of Stark and State of Ohio, have invented a new and useful Improvement in Bearing Connections for Shears, of which the following is a full, clear, and exact description.

My invention relates to means for fastening the bearing and the movable arm carrying the movable shear plate in heavy shears, or in other machinery wherein the bearing shaft is subjected to heavy strain.

The object of the invention is more particularly to provide means for holding the shaft or bearing in such a manner that the bearing can rotate in the housing and the rock arms move independently with reference to the movement of the shaft or bearing or the shaft or bearing can oscillate with the oscillations of the arm.

Another object is to provide for distributing the side thrust in such a manner that the lateral strain will be distributed equally or substantially so upon the bearings carrying the shaft, which bearings are located upon the opposite sides of the movable or oscillating arm, which in this instance carries the movable shear blade.

Further objects and advantages of the invention will appear in the course of the subjoined description.

Reference is here had to the accompanying drawing forming part of the specification, in which similar characters of reference indicate corresponding parts in all the figures of the drawings.

Figure 1 is a side elevation showing in a conventional manner the power device and the movable shear arm properly connected. Fig. 2 is a horizontal section showing portions of the housings and the shear arm also showing the shear arm shaft or bearing in proper relationship with reference to said parts. Fig. 3 is a detached view of one of the shaft holding pins or bolts. Fig. 4 is a vertical section of one of the housings, showing the retaining pin or bolt in proper position and illustrating a transverse section of the bearing shaft taken on line 2—2, Fig. 2. Fig. 5 is an enlarged view showing a part of the shaft or bearing.

In the drawings 1 represents the housings, which are of the usual construction, and are held in proper spaced relationship with reference to each other by the base plate 2. The power shaft 3, the power wheel 4, the balance wheel 5, the pinion 6 and the gear wheel 7 are of the usual construction and are simply shown conventionally together with the connection to impart a rocking or oscillating movement to the shear arm 8. These parts form no specific part of the present invention and hence no detailed description is here necessary. The shaft or bearing 9, is located in suitable bearing apertures 10 formed in the housings 1, said shaft or bearing 9 being located substantially as shown in Fig. 2. The shaft or bearing 9 is provided with the annular grooves 11 located near the ends of the shaft or bearing 9, and so located that the grooves will be inclosed in the bearing apertures 10 as illustrated in Fig. 2.

For the purpose of preventing any end movement of the shaft or bearing 9 the pins or lug bolts 12 are provided, which lug bolts are seated in the apertures 13, which apertures are located in such a position that when the pins or bolts 12 are placed in position, a portion of the pins or bolts 12 will be seated in the annular grooves 11 as best illustrated in Figs. 2 and 4.

For the purpose of preventing any accidental displacement of the lug bolts 12 their upper ends are provided with the enlarged screw threaded portions 14, which screw threaded portions fit into the screw threaded apertures 15.

For the purpose of placing the pins in position their upper ends are provided with the angular portion 16, upon which a wrench can be applied.

In practice I prefer to place the shaft or bearing 9 in the position shown in Fig. 2, before the annular grooves 11 are cut or formed, after which the apertures 13 are drilled or bored, cutting into one side of the shaft or bearing 9, a depth equal to the depth the annular grooves are to be cut, after which the annular grooves 11 are formed, it being understood that the shaft or bearing is to be removed to form the annular grooves, and then placed into position and the bolts 12 placed into position illustrated in the drawings. By this arrangement, and after the rock or oscillating arm has been mounted upon the bearing or shaft 9, said bearing or shaft is free to revolve or rock and the arm is also free to rock or move upon the bearing. In heavy shears it is of importance that the wear be such that the arm carrying the shear blade 17 can have no jerking or trembling movement. By providing for the independent rocking movement of the shaft or bearing 9 and independent movement of the arm 8 upon said shaft or bearing the wear is better distributed and the aperture through the arm and through which aperture the shaft or bearing passes will not become worn as rapidly nor will it become worn out of round, owing to the fact that the wear is distributed between the housing bearings and the shear arm bearing. Another advantage in securing the bearing or shaft as above described in shears of this kind the lateral strain which necessarily follows during the action of the shear blades is distributed as between the housings, thereby dividing the strain or in other words distributing the strain in such a manner that the side thrust will not have a tendency to weaken one housing more than the other. By providing the screw threaded portions upon the pins or bolts 12, said pins or bolts will be held against displacement and in engagement with the annular grooves formed in the shaft or bearing, but such engagement of the pins with the grooves will not interfere with the free rotation or rocking movement of the shaft or bearing.

Having fully described my invention what I claim as new and desire to secure by Letters Patent, is—

In a shearing machine, the combination of a frame provided with parallel standards formed with horizontal alined openings, each of said standards having an opening intersecting the horizontal opening, the upper portions of the intersecting openings being threaded, a shaft mounted in the horizontal openings in the standards and freely rotatable therein, said shaft having annular grooves near its ends which register with the intersecting openings, screws engaging the intersecting openings and the annular grooves, whereby to hold the shaft against lateral movement in the horizontal openings and to tie the two standards together to prevent inward and outward strain thereon, and an oscillating element loosely mounted on the shaft, whereby said shaft may revolve in the horizontal openings in the standards independently of the oscillating movement of the said element.

In testimony that I claim the above, I have hereunto subscribed my name in the presence of two witnesses.

ALBERTUS O. SLENTZ.

Witnesses:
F. W. BOND,
NILES A. SPONSELLER.

Copies of this patent may be obtained for five cents each, by addressing the "Commissioner of Patents, Washington, D. C."